April 7, 1964   J. KOSIK   3,128,078
GATE VALVE WITH PARTICULAR SEAL MEANS
Filed March 24, 1961   2 Sheets-Sheet 1

INVENTOR
JOSEPH KOSIK
BY
Charles L. Lovercheck
attorney

April 7, 1964   J. KOSIK   3,128,078
GATE VALVE WITH PARTICULAR SEAL MEANS
Filed March 24, 1961   2 Sheets-Sheet 2

INVENTOR
JOSEPH KOSIK
BY
Charles L. Lovercheck
attorney

United States Patent Office 3,128,078
Patented Apr. 7, 1964

3,128,078
GATE VALVE WITH PARTICULAR SEAL MEANS
Joseph Kosik, Main St., Townville, Pa.
Filed Mar. 24, 1961, Ser. No. 98,159
3 Claims. (Cl. 251—214)

This invention relates to valves and, more particularly, to gate valves.

The particular improvement disclosed herein relates to a gate valve with an air cushion sealer. Some of the advantages of the valve are that the manner in which the sealer is arranged in combination with the valve body results in ease and economy of fabrication and attendant results of lower cost valves. The valve is simple in design and requires little maintenance and is subject to very few faults. While this valve can be fabricated according to conventional valve dimensions, its inherent narrow design simplifies installation in existing lines with a minimum of effort.

In addition to rubber, glass, lead, and plastic bearings which may be used in this valve where application or use dictates, the metal parts of the valve may be fabricated from steel, stainless steel, bronze, or aluminum.

The valve is operated by a handwheel which may be turned in a clockwise direction to close the valve. This moves the sealing block assembly downward until it comes in contact with the bottom of the valve body. An additional force applied to the handwheel causes the trapped air in the body sealer to compress, forcing the sealer to conform to any irregularities and variations in body walls. Therefore, precision in manufacture is not necessary. At the same time, the top sealer is compressed against the machine surface of the body flange, effectively sealing the valve opening against leakage at all points.

More specifically, it is an object of the present invention to provide an improved gate valve.

Another object of the invention is to provide an improved gate valve which is simple in construction, economical to manufacture, and simple and efficient to use.

A further object of the invention is to provide an improved operating structure in a gate valve.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figures 1, 2, 7:
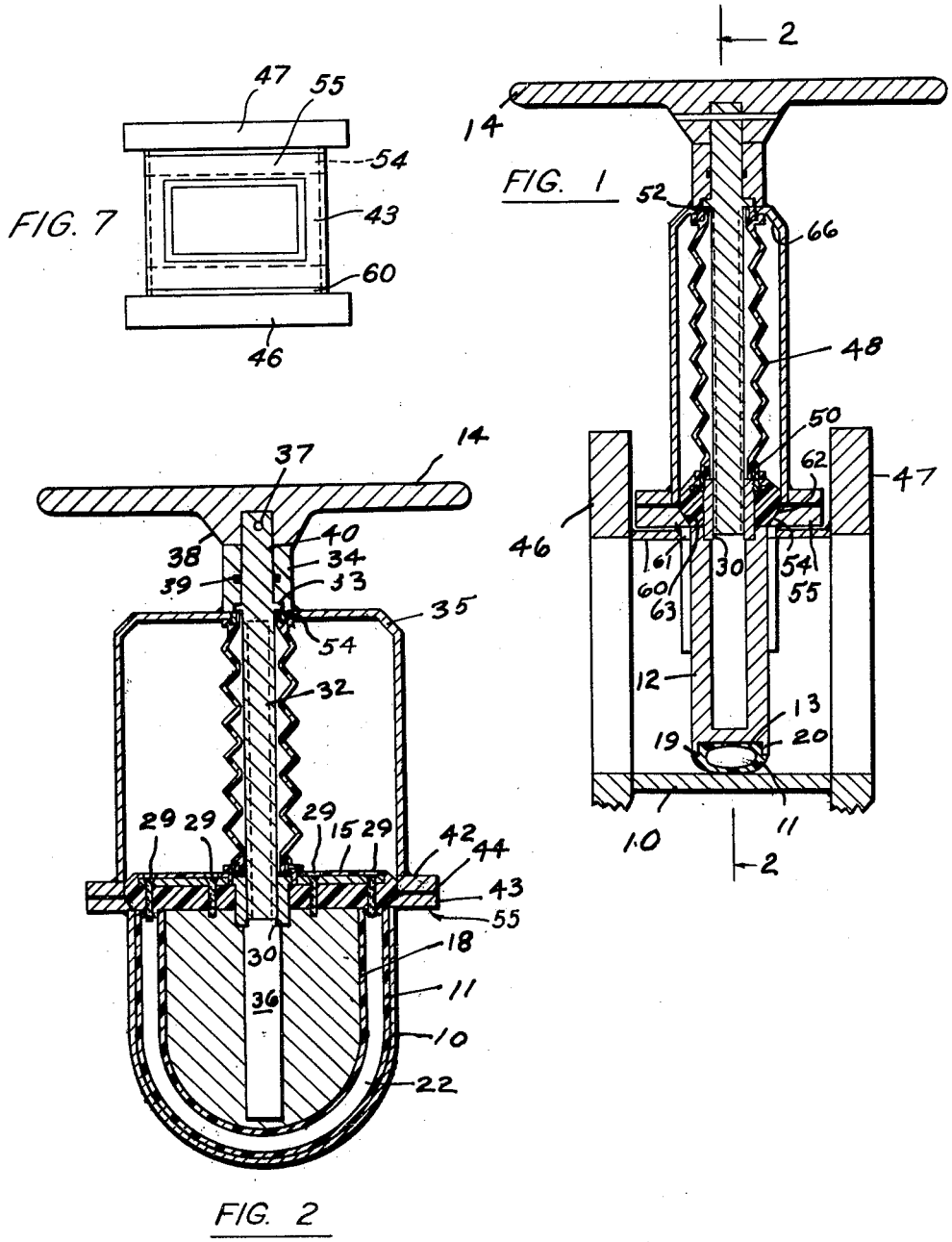
FIG. 1 is a longitudinal cross sectional view of a valve according to the invention.
FIG. 2 is a transverse cross sectional view of the valve taken on line 2—2 of FIG. 1.
FIG. 7 is a top view of the valve with the bonnet removed.
Figure 3:
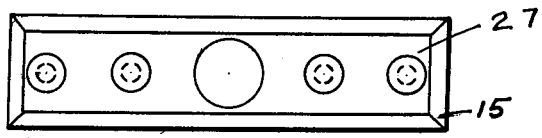
FIG. 3 is a top view of the insert for the top sealer.
Figure 4:
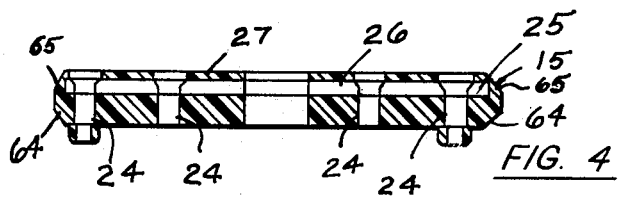
FIG. 4 is a cross sectional view of a top sealer molded from rubber as shown in FIG. 3.
Figure 5:
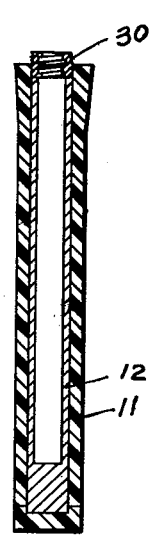
FIG. 5 is a cross sectional view taken on line 5—5 of FIG. 6.
Figure 6:
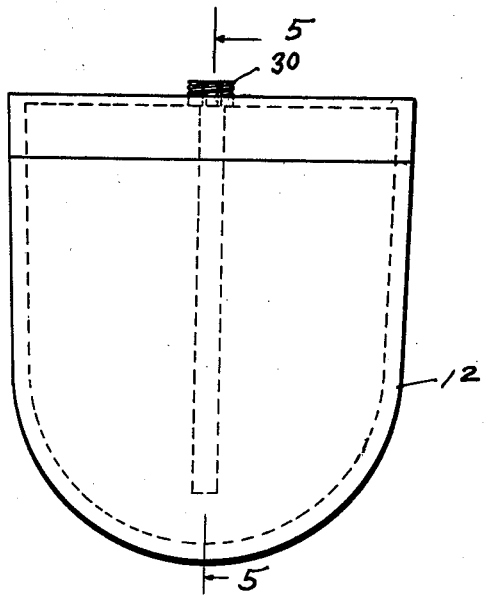
FIG. 6 is a side view of the sealing block.

Now with more specific reference to the drawings, a valve is shown having a hollow body 10 adapted to be arranged or interposed in a pipe line and formed of a plate bent in a U shape, closed at the top by a plate 60 and at the ends with flanges 46 and 47. A rectangular slot 61 is cut in the plate 60 and a mating slot 62 is cut in a plate 55 which is coextensive therewith. The slot 62 has an upwardly facing surface 63 which forms a seat for a surface 64 on a plate 26. An upper surface 65 seats on a surface 66 when the valve is open.

An expandable sealer member 11 is carried on a sealing block 12 and is received in an outer peripheral groove 13 thereof. The sealer 11 is generally flat on its inner periphery 18 and it has an outwardly extending flange 19 which engages flanges 20 defining peripheral groove 13 on the sealing block 12. The sealer is hollow and may have air trapped therein or compressed in a space 22 or the compressed air could be inserted therein.

A top sealer 15 may be made of a straight piece of molded rubber and it has holes 24 molded therein and a groove 25 formed in the top thereof which may receive the metallic plate 26. Overlying the metallic plate 26 is a sealing strip 27. Holes in the sealing strip 27 and in the metallic plate 26 register with the holes 24 and receive bolts which will hold the top sealer 15 together. Also, bolts 29 may extend through the sealer 15 and engage threaded holes in the sealing block. The plate 55 has a rectangular opening therein which is bounded by a tapered, upwardly extending shoulder 52. The plate 60 is welded to the flanges 46 and 47 at its outer ends. The plate 60 underlies the plate 55 and is welded to the plate 55 at its inner end. The lower corners of the sealer 15 are tapered to engage and seal the upwardly facing shoulder 52 of plate 55 which extends outwardly to form a flange at 43.

A nut 30 is fitted into a counterbore in the upper side of the sealing block. This nut may be welded in place in the sealing block 12 and the outer periphery of a shaft 32 is threaded and received in the nut. As a handwheel 14 is rotated, it will be held against upward and downward movement by a flange 33 thereon which is held between a flanged member 34 and the top of a bonnet 35 so that the sealing block will climb up on the threads on the shaft 32 and, at the same time, the shaft will project down into a bore 36.

The handwheel 14 is fixed to the shaft 32 by means of a pin 37 which extends through a boss 38 on the handwheel and through the shaft. A groove 39 receives an O-ring which forms a seal with a smooth upper portion 40 of the shaft.

The bonnet 35 has a lower flange 42 welded thereto which is fixed to the outwardly extending flange 43 formed by the plate 55 on the body and has a gasket 44 therebetween to form a seal. The flange 42 may be welded to the bonnet 35 and the flange 43 may be welded to the body 10. The body may be U-shaped in cross section with the flat top shown and flanges 46 and 47 may be welded to each end thereof to be connected to a suitable pipe line by bolts, welding, or the like.

A boot 48 is sealed at its lower end to the nut 30 by a suitable sealing arrangement which may be a threaded sleeve 50 as shown which threadably engages the outer threaded periphery of the nut 30 and has an overlying flange which clamps the boot 48 thereto. A similar structure may be provided at the top by way of shoulder 52 which has external threads which engage internal threads inside the upper part of the bonnet at 54.

The sealing block assembly moves up the shaft 32 and the shaft moves into the bore 36. Any leakage in the bonnet 35 is kept away from the member 32 by the boot 48. To close the valve, the handwheel 14 is rotated in the opposite direction to the opening and the sealing block is moved by the shaft 32 down into the body and the sealer member engages the inner periphery of the body and forms a seal.

The gas trapped inside the hollow of the sealer is compressed, thereby causing the sealer to conform to various irregularities in the body.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a hollow body having an inlet and an outlet, said body being generally U-shaped in transverse cross section, a generally flat plate forming one side of said body defined between the legs of said U, a bonnet supported on said plate, a generally rectangular slot in said plate forming an opening between said bonnet and the inside of said body, a generally U-shaped sealing block having a flat upper end and a curved lower end extending through said slot, a resilient sealing member attached to the outer edge of said sealing block and extending entirely around said curved end, and means extending through said bonnet to force said block through said slot into said hollow body to bring said sealing member into sealing relation with the inside of said body forming a seal between said inlet and said outlet, said sealing member having a space generally round in cross section extending around said curved end thereof, said space in said sealing member being adapted to receive gas under pressure, a second sealing member made of resilient material attached to the flat end of said sealing block, said plate having an inwardly and downwardly inclined surface around said slot, said block having a third sealing member having an inwardly and downwardly inclined undersurface thereon adapted to sealingly engage the surface of said plate around said slot when said block is in position to close said body.

2. The valve recited in claim 1 wherein said means extending through said bonnet comprises a threaded member rotatably secured to said bonnet and threadably received in said sealing block, said second sealing member surrounds said threaded member and is attached at one end thereof and to the inner side of said bonnet, providing a sealing means to prevent liquid in said valve from engaging said threaded member.

3. The valve recited in claim 2 wherein said bonnet comprises a member generally rectangular in cross section open at its end adjacent said body and having a hole in the top thereof, said hole receiving said threaded member, the one side of said bonnet being fixed to said body, said third sealing member sealingly engaging the inside of said bonnet when said valve is open.

References Cited in the file of this patent

UNITED STATES PATENTS

| | | |
|---|---|---|
| 2,204,452 | Seppelfricke | June 11, 1940 |
| 2,970,803 | Harza | Feb. 7, 1961 |
| 3,042,361 | Garrott | July 3, 1962 |

FOREIGN PATENTS

| | | |
|---|---|---|
| 160,913 | Australia | Feb. 3, 1955 |